US007028310B2

(12) United States Patent
Hertling et al.

(10) Patent No.: US 7,028,310 B2
(45) Date of Patent: Apr. 11, 2006

(54) DYNAMIC USER INTERFACES FOR NETWORK SERVICES

(75) Inventors: William E. Hertling, Portland, OR (US); Petar Obradovic, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 773 days.

(21) Appl. No.: 09/943,940

(22) Filed: Aug. 31, 2001

(65) Prior Publication Data

US 2004/0205117 A1    Oct. 14, 2004

(51) Int. Cl.
*G06F 13/00* (2006.01)
*G06F 15/16* (2006.01)

(52) U.S. Cl. .................. 719/328; 719/329; 719/320; 709/250

(58) Field of Classification Search ............ 709/201–3, 709/213, 223, 227–230, 246, 250; 719/328, 719/329, 320
See application file for complete search history.

(56) References Cited

U.S. PATENT DOCUMENTS

| 6,139,177 | A | 10/2000 | Venkatraman et al. ...... 364/188 |
| 6,233,620 | B1* | 5/2001 | Gish ........................... 709/203 |
| 6,378,001 | B1* | 4/2002 | Aditham et al. ............. 719/313 |
| 6,415,280 | B1* | 7/2002 | Farber et al. ................... 707/2 |
| 6,665,674 | B1* | 12/2003 | Buchanan et al. ............ 707/10 |
| 6,718,371 | B1* | 4/2004 | Lowry et al. ................ 709/213 |
| 2002/0156865 | A1* | 10/2002 | Rajarajan et al. ........... 709/217 |

* cited by examiner

Primary Examiner—Krisna Lim (57) ABSTRACT

In order to assure that services in an network and applications or users in the network are able to communicate and interact with one another a framework is provided that registers the service. The service provides the necessary information, in particular configuration files that are processed by the framework. The framework directly interfaces to a user by way of application or applications used by the users. An interface is established between the application and the framework allowing the user to indirectly communicate to the service by way of the framework. This allows the interface to the service and to the application to be handled by the framework.

40 Claims, 9 Drawing Sheets

DYNAMIC USER INTERFACES FOR NETWORK SERVICES

BACKGROUND OF THE INVENTION

1. Field of the Invention

This invention relates to the field of network applications such as applications on the Internet, in particular to a method and system to allow users to interface to various network services without a strict service directed user interface.

2. Description of the Related Art

The world wide web (WWW), specifically through applications has allowed for numerous services to be provided. Services include photo sharing web sites, researching databases, accessing public library catalogs, and electronic commerce (e-commerce). Web site services continue to evolve to allow greater interaction between users, providers of services and products, and web sites that allow groups to communicate. E-commerce has grown from consumers merely visiting a commercial web-site and ordering goods or services by entering account and or credit card information to interactive communication between consumers and websites. Service frameworks provide for interaction between groups in a network or the Internet. Service frameworks allow the Internet to evolve from a collection of web sites accessed by a personal computer to a network of interconnected services that work together to solve problems, perform tasks, or meet a need. Systems and services will be able to have intelligent communications with or without the need for user intervention. Service frameworks include E-speak™ developed by the Hewlett Packard Corporation and Enterprise Java Beans™ developed by Sun Microsystems, Inc.

Service frameworks define a uniform services interface or application programming interfaces (API), and uniform services interaction such as the E-speak™ engine allow services to dynamically interact to discover, negotiate, broker and compose themselves to solve a business to business, or business to consumer service request. Most service interfaces are defined by an extensible mark-up language (XML) scheme or an XML interface.

Application programs (applications) that once controlled various functions and routines were made up of large pervasive sections of code, where one user interface could suffice. Applications are now seen as a collection of individual standalone services that are distributed over a network such as the Internet and combined together by a web application to form a useful end user service. This allows for code reuse, greater flexibility, and ease of maintenance. Individual applications, however, may or may not have proper user interfaces that allow a user to communicate to services.

An application does provide a level of user interface to and interaction with a user while having various services operating in the background. In addition, some services need a minimum level of interaction with a user through a user interface.

Service frameworks typically provide an application programming interface model that does not allow individual services to provide user interfaces to the user, or otherwise directly interact with the user. Problems therefore can arise with the basic need to provide an interface between services and users.

Regardless of the service framework that is chosen, services have the ability to persist in their state or setting, or continue to maintain state. In addition, regardless of the service framework, each service will have a unique session identifier (ID) to allow interaction between services.

A need has been felt for a method and a system, in particular a service framework that allows services that do not have a user interface (UI) to communicate with a user through an appropriate UI. The service framework should be easy to use, extensible, and allow service developers to provide user interaction to their services.

SUMMARY OF THE INVENTION

The aforementioned and other features are accomplished, by providing a method and a system in which a user interface (UI) framework registers services and facilitates the creation and the processing of UI's that can be presented to end users. Service information can be provided by conveying configuration files between services and frameworks.

In certain embodiments, the method and system are accomplished by having a repository of XML-described UI's and transformations that are used by existing services and web applications.

The invention also provides for a system in which a framework registers the services and generates and processes UI's for applications. Services can use the system to provide UI regardless of service framework on user interaction device.

Other embodiments of the invention include providing computer program medium that is operable on computer systems and processors. The computer program instructions are provided as code to be processed by the computer systems and their processors.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

Figure 1:
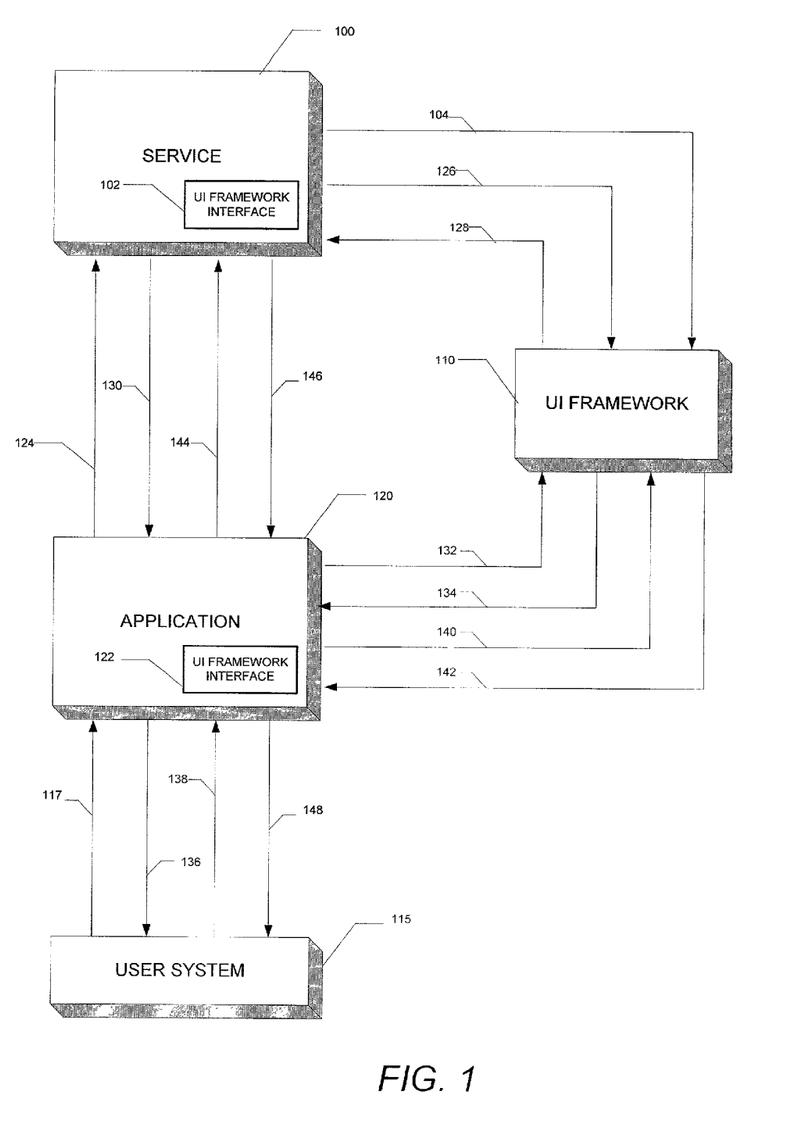
FIG. 1 is a block diagram illustrating processes between an application, a service, a user, and a user interface framework.

FIG. 1 is a block diagram illustrating processes between an application, a service, a user interface framework, and a user. A service 100 includes a UI framework interface 102. UI framework interface 102 is used to communicate to applications and UI frameworks. UI framework interface 102 performs a registration step 104 with a UI framework 110. Service 100 registers with the framework by invoking a register event method and passing a registration package. The registration package contains XML configuration data; necessary extensible style sheet language (XSL) data in the form of files; in-memory data; database reference; transformation data; and necessary handler data. A service developer creates the registration package, the registration packaging containing all necessary files to register service 100 with UI framework 110.

In this particular example, service 100 is a storage service that stores files. Service 100 also has functions that include the retrieval of files. If an application 120 requests a file from service 100 (i.e., storage) but application 120 does not specify the file, service 100 requires a display of a user interface, the user interface is used to allow user system 115 to pick from a list of files owned by user system 115.

User system 115 can be in the process of using an application 120, where application 120 can be internal or external to user system 115. Application 120 includes a UI framework interface 122. The UI framework interface 122 is used to communicate to services and UI frameworks. User system 115 can request an action of the application, step 117. For example, user system 115 can be using a printing application and user system 115 wishes to print out a file.

Application 120 requires the use of service 100 to perform the action requested by user system 115. A request is made from application 120 to service 100, step 124. The example of a printing application can involve retrieving a file from service 100 (i.e., storage). In this example application 120 requests to retrieve a file from service 100. In this example The request from application 120 to service 100, step 124, can be a programmatic call, or the request can be a message sent across a network through a protocol or an interface. In certain embodiments, application 120 builds an XML message, which contains a request for a file.

In this particular example, service 120 receives the request to retrieve a file, however, the specific file is not identified. An interaction, in particular a user interface, between user system 115 to service 120 is needed. UI framework 110 provides a calling interface that supports a method to construct a user interface. The user interface in turn provides an ability to perform file selection. A hierarchical list of file names is organized by directory and the list of file names is conveyed to UI framework 110, step 126. Step 126 can also include caching the original request for a file and associating the original request to a reference ID. The reference ID can then be used to retrieve the original request.

Once UI framework 110 receives the request from service 100, step 126, UI framework 110 builds data which represents a user interface screen in a generic manner. The data can be written in XML. For this particular example, data will be referred to as XML data. The XML data, along with an ID identifying the service 100, is sent to service 100, step 128. The reference ID can also be included in step 128.

Service 100 returns the XML data representing the user interface to application 120, step 130. Application 120 differentiates between the reply to its request in step 124 versus the XML data that represents the user interface of step 130. Step 130 further provides for UI content to be returned to application 120.

Application 120 recognizes that the received reply in step 130 contains a user interface. Application 120 in turn sends a target generic (not content generic) user interface to UI framework 110, step 132. Step 132 includes a request for a user interface view for the targeted user interface from application 120 to UI framework 110. In this particular example, the user interface view is a web browser. Based on the application type and application needs, the UI view request will contain specific UI content and relevant type of presentation. Types of presentation can include HTML based content, cellular phone based content, and digital organizer based content.

When Step 132 is completed and UI framework 110 is advised of the request for a user interface view. UI framework 110 generates hyper text markup language (HTML) code and returns the HTML code to application 120, step 134. The user interface is contained in the HTML code. The HTML code can include hidden data such as the services ID and the reference ID. Step 134 further provides that the formatted UI view be returned to the application, the view containing the service ID, the request ID, and the UI type.

Application 120 presents the user interface, which is in the form of the HTML code to a web browser contained in user system 115, step 136. The web browser of user system 115 using the HTML code is able to present an interactive user interface to user system 115, in particular the UI view is presented to an operator of user system 115.

An operator using user system 115 is able to interact with the interface web browser, in particular the operator is able to select particular files. When a specific file is chosen by the operator, user system 115 sends the request to application 120, step 138. Application 120 receives form-factor data from the user in step 138. Application 120 proceeds to send the form-factor data to UI framework 110, step 140. UI framework 110 processes the form-factor data, the form-factor data including a service ID and a reference ID.

UI framework 110 receives and processes the form-factor data from application 120, extracting necessary information from the data. The necessary information to be extracted being the file selected by the operator. UI framework 120 returns the file name, the reference ID, and the service ID (collectively known as the processed response) to application 120, step 142.

Application 120 using the service ID, sends the file name and reference ID to service 100, step 144. Application 120 is made aware of which service to contact based on the service ID, with the service ID being predefined.

Service 100 receives the file name and reference ID, and uses the references ID to find the associated request to retrieve a file. Service 100 retrieves the file that is specified and sends the specified file to application 120, step 146. Step 146 is a result of the original request of step 124. Application 120 is now able to fulfill the request made in step 124. A comparison is made as to the report in step 124 with the response provided in step 144 based on the report ID.

In this particular example of a priority application, the application 120 receives the file from the service 120 and prints the file. A confirmation is made to user system 115, step 148, indicating that the print function has been performed. Application 120 sends a response as to user system 115 request made in step 117.

Figure 2:
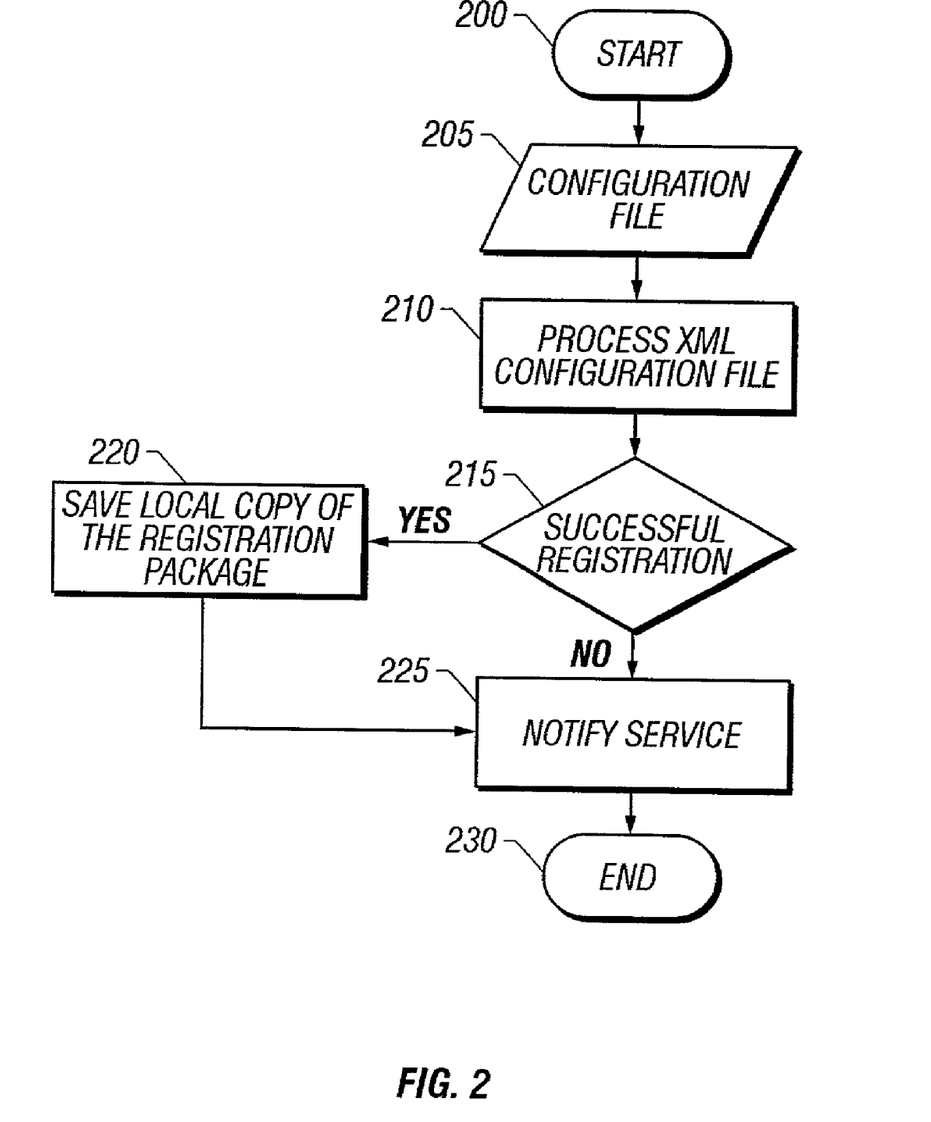
FIG. 2 is a flowchart illustrating the registration process with a service.

FIG. 2 is a flowchart illustrating the registration process with a framework. In this embodiment, the flowchart illustrates the process in which a service registers with a framework. As illustrated in FIG. 1, this is register step 104.

A service determines the need to register with a framework, and the process begins with a start event, step 200. A configuration file is sent to the framework by the service, step 205. The service creates an individual UI configuration file describing which user interface (UI) the service will use. The configuration file can be written in XML. XML is a markup language for documents containing structured information. Structured information contains both content (words, pictures, etc.) and some indication of what role the content plays. For example, content in a section heading has a different meaning from content in a footnote, which means something different than content in a figure caption or content in a database table, etc. Almost all documents have some structured information (i.e., content). Attached in an appendix is an example of an XML content file.

The service then creates all necessary files to support the configuration file. These files provide XSL transformations for different types of user interface views and custom result handlers. XSL transformation is a language for transforming XML documents. The configuration file and the support files are passed to the framework during the registration process. Attached in an appendix is an example of a configuration file.

A configuration file consists of a list of predefined or custom user interfaces the service will use. For each customized user interface, the configuration file includes a list of different types of target applications that are supported (applications can include web applications, cellular phones, and digital organizers); a list of transformations that are supported for building the actual UI view (this is the standard XSL transformation that can be standard that is provided by the framework or a custom XSL transformation); and a list of handlers for each individual target.

The framework processes the XML configuration file, step 210. A determination is made if a successful registration has been accomplished, step 215. A successful registration provides the framework to save a local copy of the registration package, step 220. An unsuccessful registration provides for the framework to notify the service, step 225. Step 225 can also provide that the service is notified when a successful registration takes place. The service is now ready to use the UI framework. The service registration process then is completed, step 230.

User Interface (UI) Request

A UI request is created by a service in one of the following ways:

For predefined UI types the service invokes a predefined method and passes required parameters. In other words a question or a list of items is passed by the service.

For custom UI types the service invokes a generic method and passes XML formatted content. The content must be compatible with XSL transformation provided in the registration package.

Figure 3:
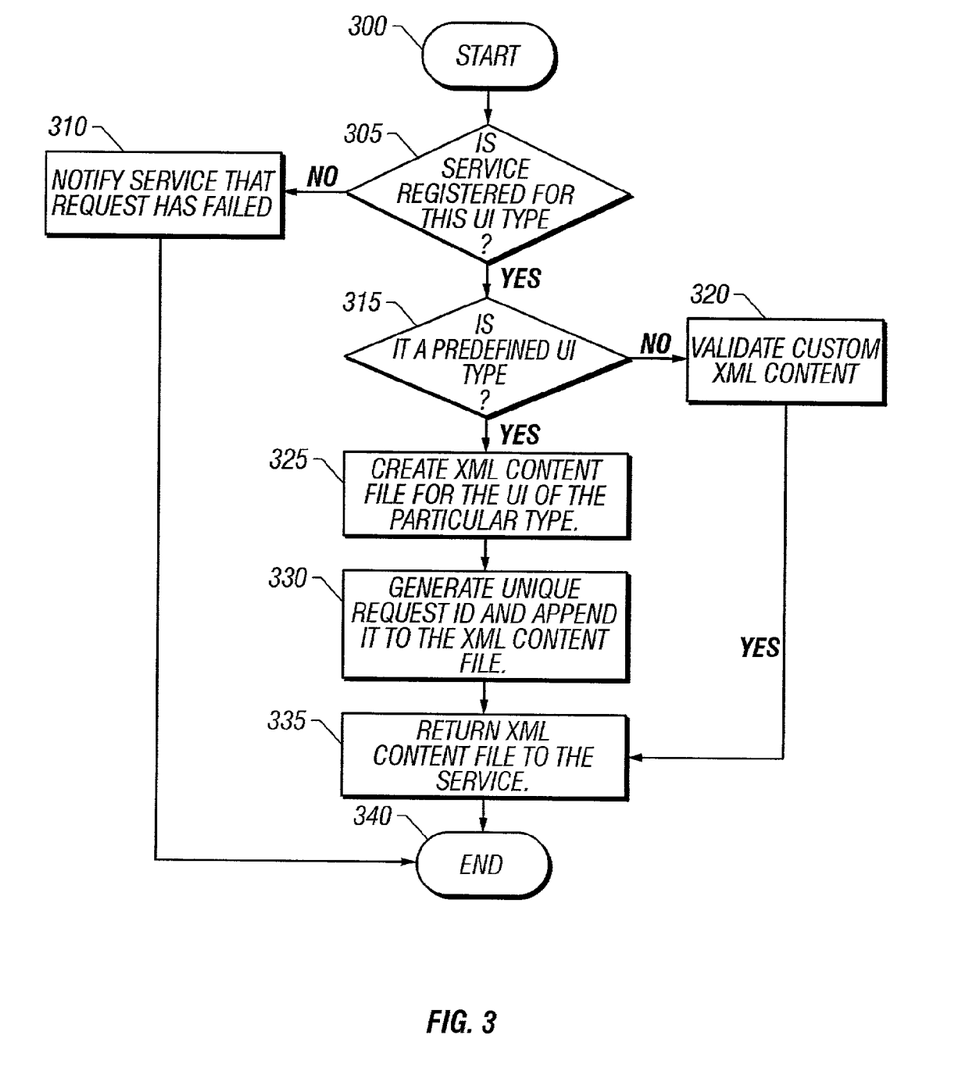
FIG. 3 is a flowchart illustrating requesting user interface content by a service.

Now referring to FIG. 3 shown is a flowchart illustrating requesting user interface content by a framework. This particular process illustrates the process in which a service and a framework request and provide UI content. As illustrated in FIG. 1, this is the UI request step 145. A determination is made as to the exchange for UI content and the process begins with a start event, step 300. The framework determines if the service is registered for the UI type 305, the registration event illustrated in FIG. 2. If the service is not registered with the framework the request from the service has failed, the service is notified, step 310, and the process is ended, step 340. If the service is registered and has a valid UI type a determination is made if the UI type is predefined, step 315. A UI type that is not predefined provides a validation of custom XML content, step 320. The XML content file is returned to the service, step 335, and the process is ended, step 340. If the UI type is predefined, an XML content file is created for the UI of the particular type, step 325. The framework generates a unique request ID and appends it to the XML content file, step 330. The XML content file is returned to the service, step 335, and the process is ended, step 340.

Requesting a UI View

The application receives the UI content from a service. The content is generic and it is not formatted for a particular target application view. The application passes the UI content to the framework in order to receive back the actual UI formatted for viewing. Once the UI is returned, the UI is displayed to the end user.

Processing the UI View

Figure 4:
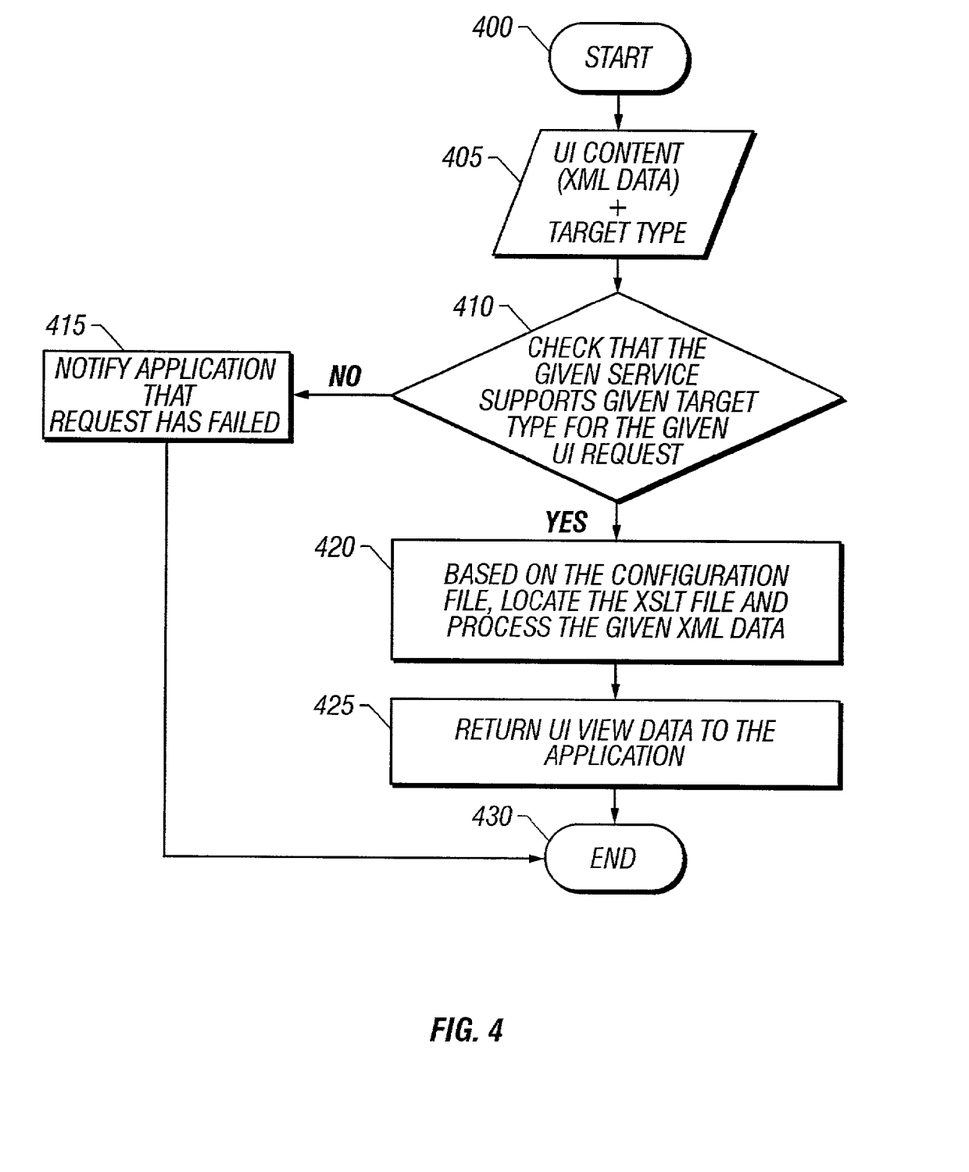
FIG. 4 is a flowchart illustrating requesting a user interface view from the application to the user interface framework.

Now referring to FIG. 4 shown is a flowchart illustrating requesting a user interface view from the application to the user interface framework. This particular process illustrates the process in which an application requests a UI view through a UI framework. As illustrated in FIG. 1, this is the request UI event 130. The process begins with start event 400, which can be initiated by the application. The application submits UI content in the form of a XML file in addition to a target type to the UI framework, step 405. A check is performed that the service supports the target type for the given UI request 410. If the check fails, the framework notifies the application that the request has failed, step 415, and the process is ended 430. If the check passes, using the configuration file, the framework locates the XSL transformation file, and processes the received XML data through a target (application) specific handler defined in the service's configuration file, step 420. The UI view data is then returned to the application, step 425, and the process is ended, step 430.

Figure 5:
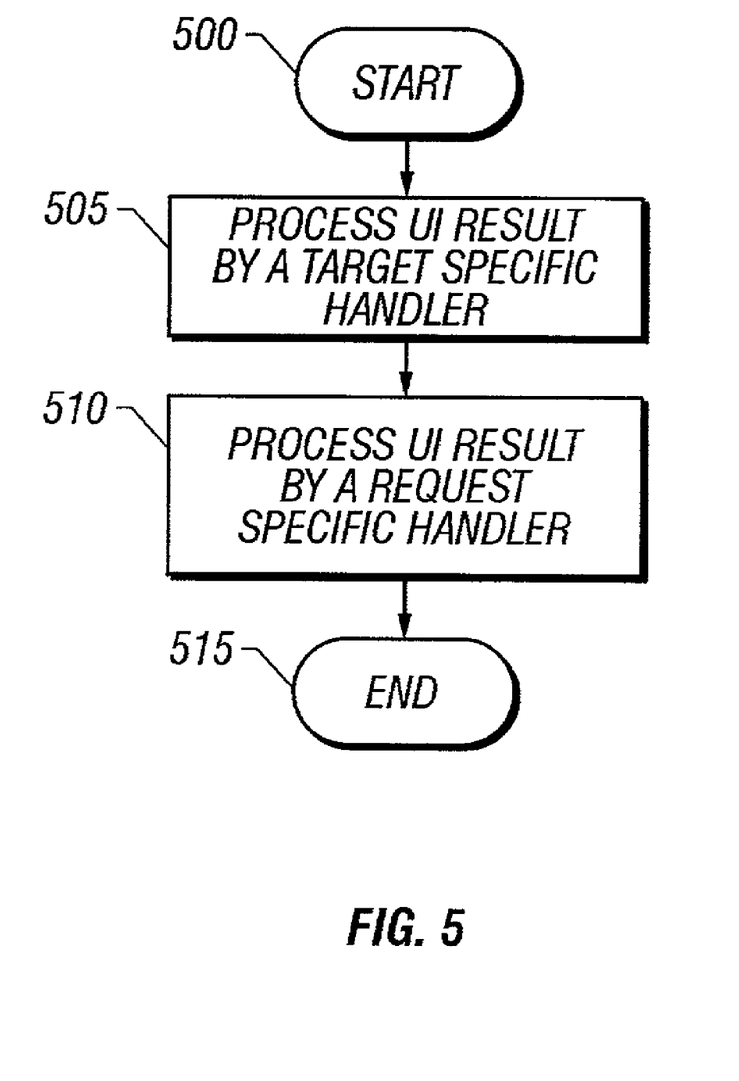
FIG. 5 is a flowchart illustrating a user interface process response from the application to the user interface framework.

Now referring to FIG. 5 shown is a flowchart illustrating processing of a user interface response from the application to the framework. This particular process illustrates the process in which an application requests processing of a UI response from an application to a framework. As illustrated in FIG. 1, this is the process UI response event, step 135. The process is initiated with a start event by the application, step 500. The framework processes the UI result with a target specific handler, step 505. The UI result is processed by a request specific handler, step 510, and the process is ended, step 515. The result of processing is returned to the application, which in turn sends the result to the service.

Figure 6:
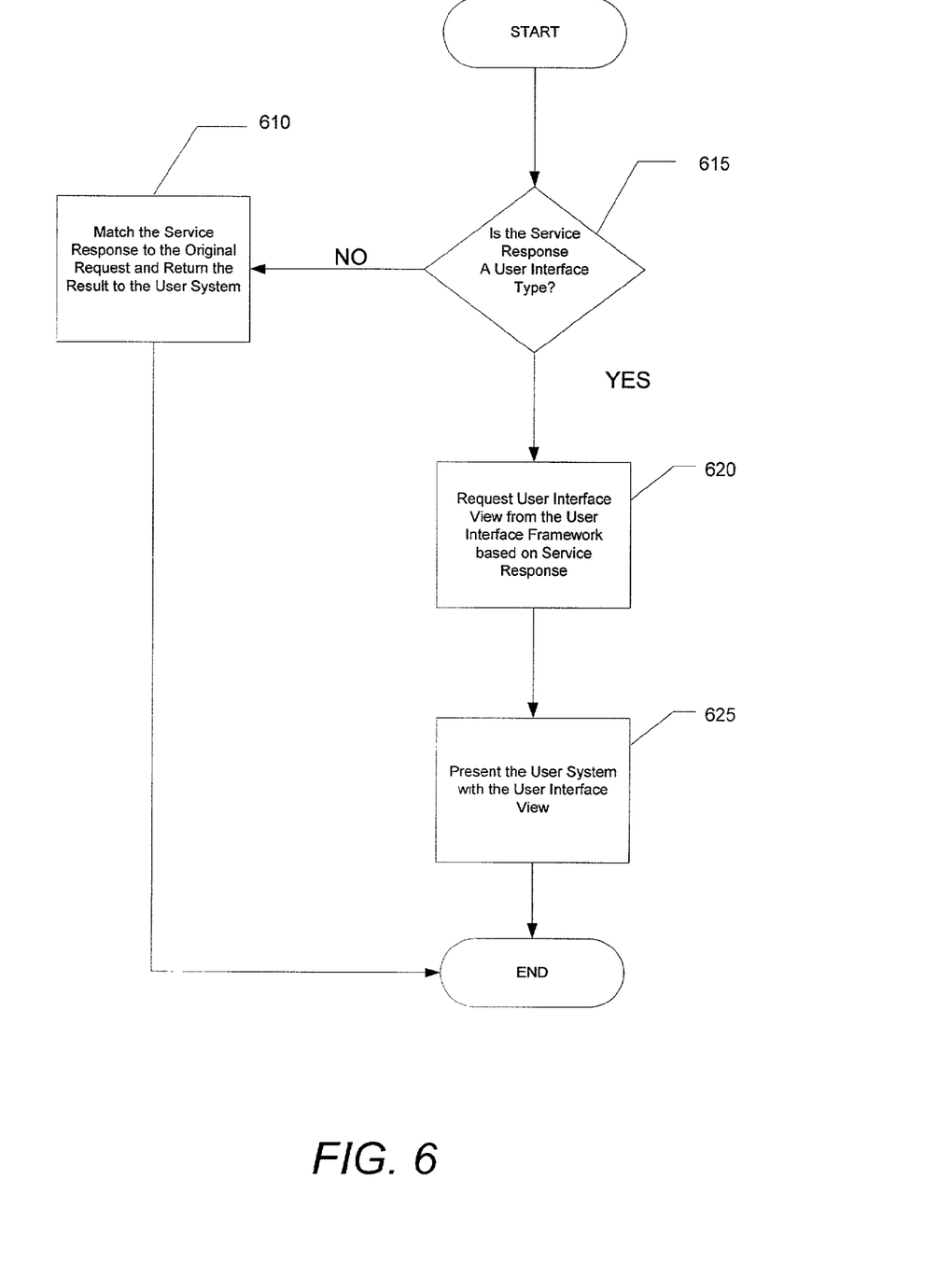
FIG. 6 is a flowchart illustrating a service interaction process mode by the application.

FIG. 6 is a flowchart illustrating a service interaction process mode by an application. A determination step 615 is made as to the response from the service is the type that requires a user interface, step 615. If a service response is not of the type that requires a user interface, the service response is matched to the original request made and the result is returned to the operator through the user system, step 610. If the service response does require a user interface, a request is made from the UI framework, step 620. Step 620 is based on particular service responses. The user system is presented with a usable user interface that allows the user to perform required functions, step 625. In this particular example, the user is provided with a user interface that allows for choosing files.

An Example Computing and Network Environment

Figure 7:
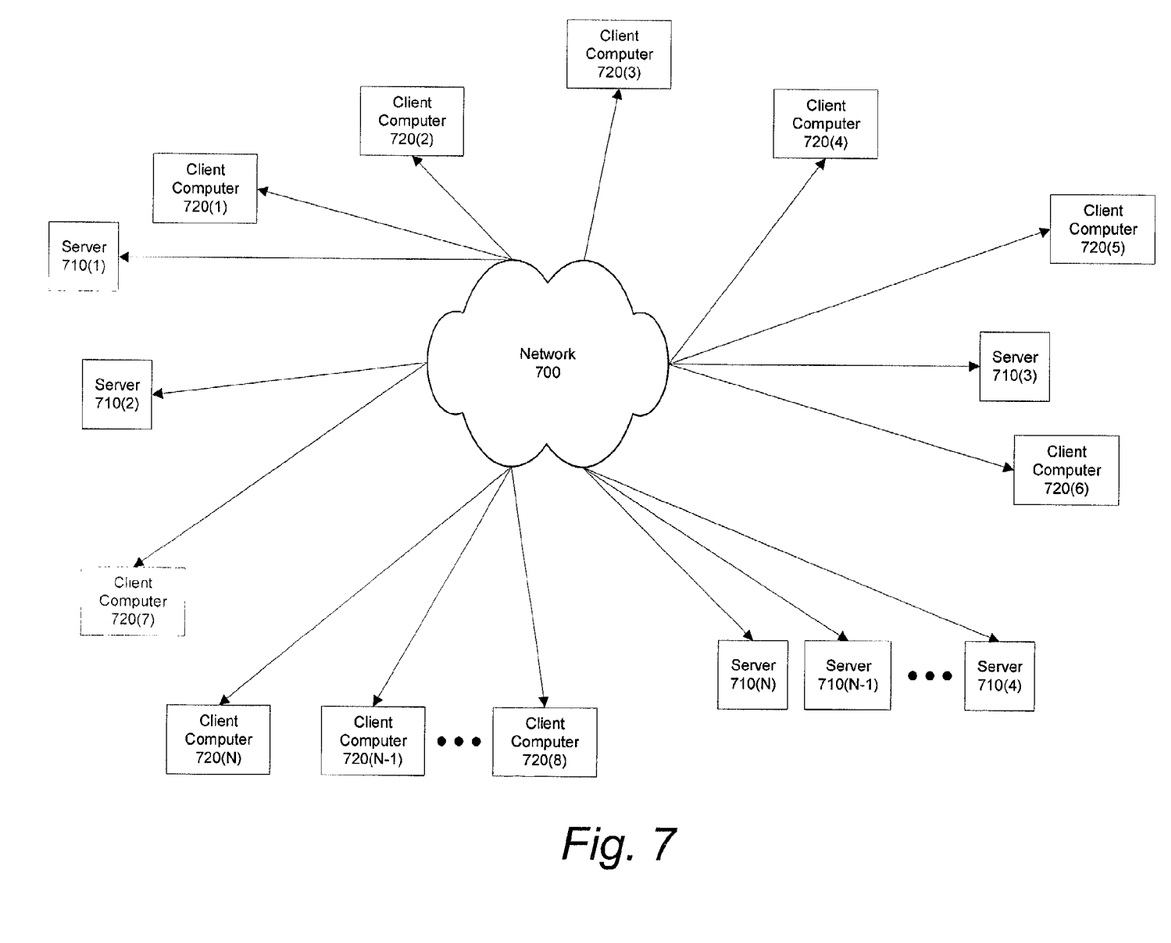
FIG. 7 is a block diagram illustrating a network environment in which commercial transaction processing according to embodiments of the present invention may be practiced.

FIG. 7 is a block diagram illustrating a network environment in which a system according to the present invention may be practiced. As is illustrated in FIG. 7, network 700, such as a private wide area network (WAN) or the Internet, includes a number of networked servers 710(1)–(N) that are accessible by client computers 720(1)–(N). Communication between client computers 720(1)–(N) and servers 701(1)–(N) typically occurs over a publicly accessible network, such as a public switched telephone network (PSTN), a DSL connection, a cable modem connection or large bandwidth trunks (e.g., communications channels providing T1 or OC3 service). Client computers 720(1)–(N) access servers 701(1)–(N) through, for example, a service provider. this might be, for example, an Internet Service Provider (ISP) such as America On-Line™, Prodigy™, CompuServe™ or the like. Access is typically had by executing application specific software (e.g., network connection software and a browser) on the given one of client computers 720(1)–(N).

One or more of client computers 720(1)–(N) and/or one or more of servers 701(1)–(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems, which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 720(1)–(N) is shown in detail in FIG. 7.

Figure 8:
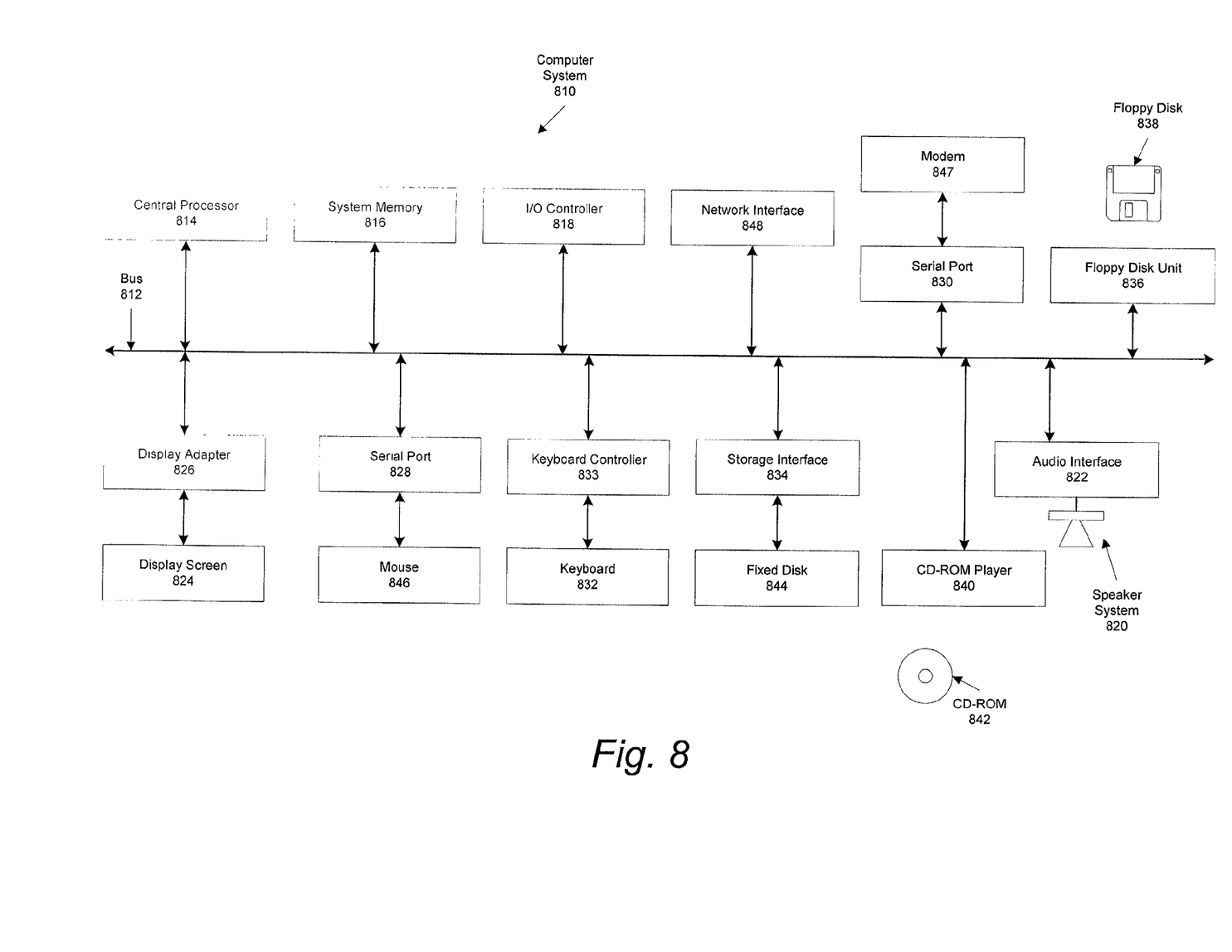
FIG. 8 is a block diagram illustrating a computer system suitable for implementing embodiments of the present invention.

FIG. 8 depicts a block diagram of a computer system 810 suitable for implementing the present invention, and example of one or more of client computers 720(1)–(N). Computer system 810 includes a bus 812 which interconnects major subsystems of computer system 810 such as a central processor 814, a system memory 816 (typically RAM, but which may also include ROM, flash RAM, or the like), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834, a floppy disk drive 836 operative to receive a floppy disk 838, and a CD-ROM drive 840 operative to receive a CD-ROM 842. Also included are a mouse 846 (or other point-and-click device, coupled to bus 812 via serial port 828), a modem 847 (coupled to bus 812 via serial port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., CD-ROM drive 840), floppy disk unit 836 or other storage medium. Additionally, applications may be in the form of electronic signals modulated in accordance with the application and data communication technology when accessed via network modem 847 or interface 848.

Storage interface 834, as with the other storage interfaces of computer system 810, may connect to a standard computer readable medium for storage and/or retrieval of information, such as a fixed disk drive 844. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliance, X-window terminal or other such computing device. The operating system provided on computer system 810 may be MS-DOS®, MS-WINDOWS®, OS/2®, UNIX®, Linux® or other known operating system. Computer system 810 also supports a number of Internet access tools, including, for example, an HTTP-compliant web browser having a JavaScript interpreter, such as Netscape Navigator® 8.0, Microsoft Explorer® 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 810). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 9:
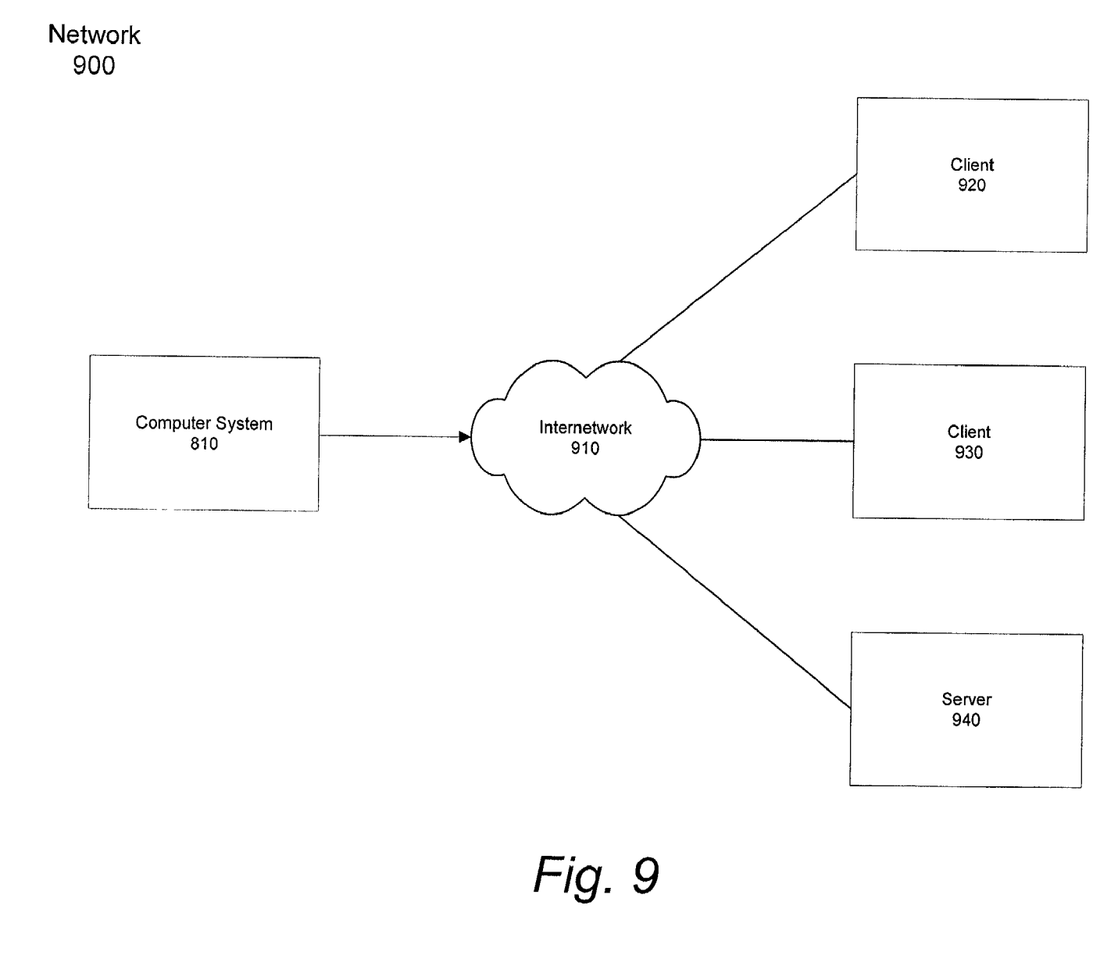
FIG. 9 is a block diagram illustrating the interconnection of the computer system of FIG. 8 to client and host systems.

FIG. 9 is a block diagram depicting a network 900 in which computer system 810 is coupled to an internetwork 910, which is coupled, in turn, to client systems 920 and 930, as well as a server 940. Internetwork 910 (e.g., the Internet) is also capable of coupling client systems 920 and 930, and server 940 to one another. With reference to computer system 810, modem 947, network interface 948 or some other method can be used to provide connectivity from computer system 810 to internetwork 910. Computer system 810, client system 920 and client system 930 are able to access information on server 940 using, for example, a web browser (not shown). Such a web browser allows computer system 810, as well as client systems 920 and 930, to access data on server 940 representing the pages of a website hosted on server 940. Protocols for exchanging data via the Internet are well known to those skilled in the art. Although FIG. 9 depicts the use of the Internet for exchanging data, the present invention is not limited to the Internet or any particular network-based environment.

Referring to FIGS. 7, 8 and 9, a browser running on computer system 810 employs a TCP/IP connection to pass a request to server 940, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

Although the present invention has been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of establishing an interface between a service and an application, wherein the interface is a computer interface, the service is provided through a network, and the application operates on the computer, the method comprising:
    configuring a computer implemented framework manaaement module that creates a graphical user interface that directly interfaces the service through the network to a user operating the application of the computer; and
    using the framework to register the service, generate a unique reauest identification, append the unique reauest identification to a content file, return the content file to the service, and provide service information from the framework to the computer application through the user interface, wherein the framework facilitates the creation and processing of user interfaces that are oresented to the user.

2. The method of establishing an interface between a service and an application of claim 1 further comprising:
    providing a configuration file from the service to the framework.

3. The method of establishing an interface between a service and an application of claim 2 wherein the configuration file is written in an extensible markup language.

4. The method of establishing an interface between a service and an application of claim 2 wherein the framework processes the configuration file as part of the registering of the service.

5. The method of establishing an interface between a service and an application of claim 2 wherein the configuration file is further comprised of extensible style-sheet markup language transformation files.

6. The method of establishing an interface between a service and an application of claim 2 wherein the configuration file further comprises:
    predefined user interfaces;
    a list of target applications that are supported;
    a list of transformations that are supported; and
    a list of application specific handlers.

7. The method of establishing an interface between a service and an application of claim 6 wherein the configuration file is written in an extensible markup language.

8. The method of establishing an interface between a service and an application of claim 6 wherein the configuration file is further comprised of extensible style-sheet markup language transformation files.

9. A system of establishing an interface between a service and an application, wherein the interface is a computer interface, the service is provided through a network, and the application operates on the computer, the system being comprised of:
    a computer implemented framework configured to create a graphical user interface that directly interfaces the service through the network to a user operating the application of the computer, wherein the framework
    registers the service,
    generates a unique request identification;
    appends the unique request identification to a content file;
    returns the content file to the service; and
    provides service information to the application.

10. The system of establishing an interface between a service and an application of claim 9 wherein the service provides a configuration file to the framework.

11. The system of establishing an interface between a service and an application of claim 10 wherein the configuration file is written in an extensible markup language.

12. The system of establishing an interface between a service and an application of claim 10 wherein the configuration file is further comprised of extensible style-sheet markup language transformation files.

13. The system of establishing an interface between a service and an application of claim 10 wherein the framework processes the configuration file as part of the registering of the service.

14. The system of establishing an interface between a service and an application of claim 10 wherein the service provides a configuration file to the framework, wherein the configuration file further comprises of:
predefined user interfaces;
a list of target applications that are supported;
a list of transformations that are supported; and
a list of application specific handlers.

15. The system of establishing an interface between a service and an application of claim 14 wherein the configuration file is written in an extensible markup language.

16. The system of establishing an interface between a service and an application of claim 14 wherein the configuration file is further comprised of extensible style-sheet markup language transformation files.

17. A computer system comprising:
a processor;
a computer running an application;
computer readable medium coupled to the processor; and
computer code encoded in the computer readable medium, configured to cause the processor to use a framework that creates a graphical user interface that directly interfaces an Internet service to a user operating the application of the comouter and wherein the framework registers the service, generates a unique request identification, appends the unique request identification to a content file, returns the content file to the service, and provides service information from the framework to the computer application through the user interface, wherein the mework facilitates the creation and rocessin of user interfaces that are presented to the user.

18. The computer system of claim 17 wherein the computer code is further configured to cause the processor to:
provide a configuration file from the service to the framework.

19. The computer system of claim 18 wherein the configuration file is written in an extensible markup language.

20. The computer system of claim 18 wherein the framework process the configuration file as part of registering the service.

21. The computer system of claim 18 wherein the configuration file is further comprised of extensible style-sheet markup language transformation files.

22. The computer system of claim 18 wherein the configuration file further comprises:
predefined user interfaces;
a list of target applications that are supported;
a list of transformations that are supported; and
a list of application specific handlers.

23. The computer system of claim 18 wherein the configuration file is written in an extensible markup language.

24. The computer system of claim 18 wherein the configuration file is further comprised of extensible style-sheet markup language transformation files.

25. An apparatus implemented in a computer environment for establishing a user interface between an Internet service and an application running on a comouter comprising:

means for providing a computer implemented framework, the framework interfacing directly to the service and the framework directly interfacing to the application, wherein the framework facilitates the creation and processing of user interfaces that are operable in the computer environment by a user;
means for registering the service with the framework;
means for generating a unique request identification;
means for appending the unique request identification to a content file;
means for returning the content file to the service; and
means for providing service information from the framework to the application.

26. The apparatusof claim 25 further comprising:
means for providing a configuration file from the service to the framework.

27. The apparatus of claim 26 wherein the configuration file is written in an extensible markup language.

28. The apparatus of claim 26 wherein the framework processes the configuration file as part of the means for registering the service with the framework.

29. The apparatus of claim 26 wherein the configuration file is further comprised of extensible style-sheet markup language transformation files.

30. The apparatus of claim 26 wherein the configuration file further comprises:
predefined user interfaces;
a list of target applications that are supported;
a list of transformations that are supported; and
a list of application specific handlers.

31. The apparatus or claim 26 wherein the configuration file is written in an extensible markup language.

32. The apparatus of claim 26 wherein the configuration file is further comprised of extensible style-sheet markup language transformation files.

33. A computer program product encoded in computer readable media and implemented in a computer environment, the computer program product comprising:
a first set of instructions, executable on a computer system, configured to provide a framework implemented in the computer environment, the framework interfacing directly to an Internet service and the framework directly interfacing to a computer application;
a second set of instructions, executable on the computer system, configured to register the service with the framework for creating a graphical user interface that directly interfaces the Internet service to a user operating the application of the computer, wherein the second set of instructions further generates a unique request identification, appends the unique request identification to a content file, returns the content file to the service; and
a third set of instructions, executable on the computer system, configured to provide service information from the framework to the application.

34. The computer program product of claim 33 further comprising:
a fourth set of instructions, executable on the computer system, configured to provide a configuration file from the service to the framework.

35. The computer program product of claim 34 wherein the configuration file is written in an extensible markup language.

36. The computer program product of claim 34 wherein the framework processes the configuration file as part of the second set of instructions.

37. The computer program product of claim 34 wherein the configuration file is further comprised of extensible style-sheet markup language transformation files.

38. The computer program product of claim 34 wherein the configuration file further comprises of:
  predefined user interfaces;
  a list of target applications that are supported;
  a list of transformations that are supported; and
  a list of application specific handlers.

39. The computer program product of claim 38 wherein the configuration file is written in an extensible markup language.

40. The computer program product of claim 38 wherein the configuration file is further comprised of:
  extensible style-sheet markup language transformation files.

\* \* \* \* \*

UNITED STATES PATENT AND TRADEMARK OFFICE
CERTIFICATE OF CORRECTION

| | |
|---|---|
| PATENT NO. | : 7,028,310 B2 |
| APPLICATION NO. | : 09/943940 |
| DATED | : April 11, 2006 |
| INVENTOR(S) | : William E. Hertling et al. |

It is certified that error appears in the above-identified patent and that said Letters Patent is hereby corrected as shown below:

In column 7, line 10, delete "701" and insert -- 710 --, therefor.

In column 7, line 15, delete "701" and insert -- 710 --, therefor.

In column 7, line 16, delete "this" and insert -- This --, therefor.

In column 7, line 24, delete "701" and insert -- 710 --, therefor.

In column 9, line 30, delete "intemetwork" and insert -- internetwork --, therefor.

In column 10, lines 7-8, in Claim 1, delete "manaaement" and insert -- management --, therefor.

In column 10, line 12, in Claim 1, before "identification" delete "reauest" and insert -- request --, therefor.

In column 10, line 12, in Claim 1, after "the unique" delete "reauest" and insert -- request --, therefor.

In column 10, lines 17-18, in Claim 1, delete "oresented" and insert -- presented --, therefor, In column 11, line 32, in Claim 17, delete "comouter" and insert -- computer --, therefor.

In column 11, line 38, in Claim 17, delete "mework" and insert -- framework --, therefor.

In column 11, line 39, in Claim 17, delete "rocessin" and insert -- processing --, therefor.

In column 11, line 67, in Claim 25, delete "comouter" and insert -- computer --, therefor.

UNITED STATES PATENT AND TRADEMARK OFFICE
CERTIFICATE OF CORRECTION

PATENT NO. : 7,028,310 B2
APPLICATION NO. : 09/943940
DATED : April 11, 2006
INVENTOR(S) : William E. Hertling et al.

It is certified that error appears in the above-identified patent and that said Letters Patent is hereby corrected as shown below:

In column 12, line 14, in Claim 26, delete "apparatusof" and insert -- apparatus of --, therefor.

In column 12, line 32, in Claim 31, delete "or" and insert -- of --, therefor.

Signed and Sealed this

Eleventh Day of August, 2009

David J. Kappos
*Director of the United States Patent and Trademark Office*